United States Patent [19]

Little, Jr. et al.

[11] Patent Number: 5,047,822
[45] Date of Patent: Sep. 10, 1991

[54] ELECTRO-OPTIC QUANTUM WELL DEVICE

[75] Inventors: John W. Little, Jr., Wheaton; Richard P. Leavitt, Silver Spring, both of Md.

[73] Assignee: Martin Marietta Corporation, Bethesda, Md.

[21] Appl. No.: 172,518

[22] Filed: Mar. 24, 1988

[51] Int. Cl.$^5$ ............... H01L 27/14; H01L 31/00
[52] U.S. Cl. ........................ 357/30; 357/4; 357/16; 350/355
[58] Field of Search ............ 357/30 L, 16, 4; 350/355

[56] References Cited

U.S. PATENT DOCUMENTS

| | | | |
|---|---|---|---|
| 4,665,412 | 5/1987 | Ohkawa et al. | 357/4 X |
| 4,705,361 | 11/1987 | Frazier et al. | 357/16 X |
| 4,720,309 | 1/1988 | Deveaud et al. | 357/16 X |
| 4,727,341 | 2/1988 | Nishi et al. | 357/16 X |
| 4,745,452 | 5/1988 | Sollner | 357/4 X |

OTHER PUBLICATIONS

Applied Physics Letters, vol. 51, No. 6, Aug. 10, 1987, American Institute of Physics, (New York, U.S.), T. Nakagawa et al.: "Thermally Stimulated Resonant Current in AlGaAs/GaAs Triple Barrier Diodes".
Journal of Cyrstal Growth, vol. 81, 1987, Elsevier Science Publishers, R. V., (North-Holland Physics Publ. Division), (Amsterdam, NL.), H. Kano et al.: "Negative Differential REsistance Device Built in a Biwell GaAs-/AlGaAs Superlattice", pp. 144–148.
Electronics Letters, vol. 23, No. 17, Aug. 13, 1987 (London, G.B.), T. H. Wood et al.: "High-Speed 2×2 Electrically Driven Spatial Light Modulator Made with GaAs/AlGaAs Multiple Quantum Wells (MQWs)", pp. 916–917.
Applied Physics Letters, vol. 50, No. 7, Feb. 16, 1987, American Institute of Physics (New York, U.S.), U. Koren et al.: "InGaAs/InP Multiple Quantum Well Waveguide Phase Modulator", pp. 368–370.
Applied Physics Letters, vol. 22, No. 11, Jun. 1, 1973, IBM Thomas J. Watson Research Center (New York, U.S.), R. Tsu et al.: "Tunneling in a Finite Superlattice", pp. 562–564.
J. Optical Society of American, vol. 2, No. 7, Jul. 1985, AT&T Bell Laboratories, (New Jersey, U.S.), D. S. Chemla et al.: "Room-Temperature Excitonic Non-linear-Optical Effects in Semiconductor Quantum-Well Structures", pp. 1155–1173.

Primary Examiner—Andrew J. James
Assistant Examiner—Sara W. Crane
Attorney, Agent, or Firm—James B. Eisel; Gay Chin

[57] ABSTRACT

A quantum well semiconductor device that is responsive to optical energy and operates by resonant field ionization of quantum confined excitons and comprises a semiconductor device including a multi-layered semiconductor structure fabricated on the substrate and including at least two quantum well layers of mutually different widths separated from each other by a semiconductor barrier layer. Because of the different widths, the two quantum well layers have distinct and different electron and hole sub-band energies which when an external electric field is applied across the semiconductor structure, it is possible to bring the electron sub-bands of the wells into resonance, whereupon electrons tunnel back and forth through the barrier layer thereby altering the light absorption coefficient near the excitonic absorption feature. This mechanism provides a means to phase shift or modulate the light traversing through the device.

9 Claims, 4 Drawing Sheets

ELECTRO-OPTIC QUANTUM WELL DEVICE

This invention was made with Government support under contract number F19628-86-C-0059 awarded by RADC Hanscom Airforce Base. The Government has certain rights in this invention.

BACKGROUND OF THE INVENTION

This invention relates generally to semiconductor devices and more particularly to quantum well electro-optic semiconductor devices.

Electro-optic devices have been an important part of modern optical systems for both military and commercial applications. Such apparatus include semiconductor devices and are typically comprised of materials such as KDP and $LiNbO_3$. Such materials, however, cannot be integrated onto a chip, but must normally be used as discrete elements in an optic system. As a result, the present day systems of this type are bulky, massive and expensive.

New developments in the technology of ultra-small semiconductor devices now make possible a new generation of devices in which several optical components are integrated onto a single chip. One such device is based on the technology relating to quantum wells in semiconductors and the quantum confined Stark effect which has been utilized in the prior art to implement both optical phase shifters and modulators.

Quantum wells in semiconductors as well as the concept of electron tunneling therebetween have been disclosed by R. Tsu and L. Esaki, Appl. Phys. Lett. 22, 562 (1973). The quantum confined Stark effect, moreover, has also been disclosed, a typical example being the publication of D. S. Chemla and D. A. B. Miller, J. Opt. Soc. Am., B. 2, 1155 (1985).

In a quantum well, a layer of semiconductor material, grown, for example, by molecular beam epitaxy, is sandwiched between cladding layers made from a different semiconductor with the resulting structure being in the form of a superlattice. Because of the small size of the quantum well, i.e. on the order of 100 Å, electronic motion in the direction perpendicular to the well is quantized, leading to the formation of electron and hole sub-bands in the conduction and valence bands, respectively. In addition, an electron - hole pair in a semiconductor can form a bound state, similar to a hydrogen atom, which is known as an exciton. Because their binding energies are larger in quantum wells than in bulk semiconductors, these excitons are stable at room temperature. This stability leads to the quantum-confined Stark effect.

In the quantum-confined Stark effect, the wavelength of the peak optical absorption feature in quantum wells associated with the creation of an electron-hole pair in a formation of an exciton shifts in response to an applied electric field. This shift occurs for two reasons. First, the difference between electron and hole sub-band energies in the quantum wells varies as a function of the applied field and secondly, the binding energy of the exciton varies with the applied field. Because of the interaction of electrons and holes in the quantum well with impurities and with phonons, the absorption feature associated with excitation formation has a finite spectral width. Therefore, the transmission through a quantum well sample at an operating wavelength near that of the excitonic absorption feature will vary as a function of applied bias when the feature is "tuned" through an operating wavelength. When such devices are utilized to optically modulate an optical signal, electric fields of the order of 100,000 V/cm are necessary.

Also because of the Kramers-Kronig relations describing the connection between the real and imaginary parts of the refractive index of the material, the shift in the peak absorption feature leads to a change in refractive index of a quantum well system at wavelengths which are somewhat larger than that of the peak absorption feature. Therefore, it is possible to obtain a sizable phase shift in a quantum well structure.

It is an object of the present invention, therefore, to provide an improved quantum well semiconductor device.

It is a further object of the invention to provide improved modulation of an optical beam with a quantum well semiconductor device.

It is a further object of the invention to provide improved phase shifting of an optical beam with a quantum well semiconductor device.

It is yet another object of the invention to implement an array of quantum well semiconductor devices for operating either as an electro-optic phase shifter or an electro-optic modulator.

It is a further object to provide an improved electro-optic device which can be integrated with other types of optical components in an optical system.

SUMMARY

Briefly, the foregoing and other objects of the invention are fulfilled by a new type of quantum well semiconductor device that operates not by means of the quantum-confined Stark effect, but by means of a new effect being that of resonant field ionization of quantum confined excitons. This is provided by fabricating a semiconductor device having at least two quantum wells of different widths in relative close proximity to one another and being separated by the semiconductor barrier region. Because of the differing widths, the two quantum wells have distinct electron and hole sub-band energies which when an external electric field is applied across the two wells, it is possible to bring their electron sub-bands into resonance. At resonance, electrons tunnel back and forth through the barrier region between wells thereby altering the absorption coefficient of light near the excitonic absorption feature. This provides a means to phase shift or modulate an impinging light beam.

BRIEF DESCRIPTION OF THE DRAWINGS

The objects of the present invention and the attendant advantages thereof will become apparent by reference to the following drawings wherein like numerals refer to like parts, and wherein.

DETAILED DESCRIPTION OF THE INVENTION

Figure 1A:
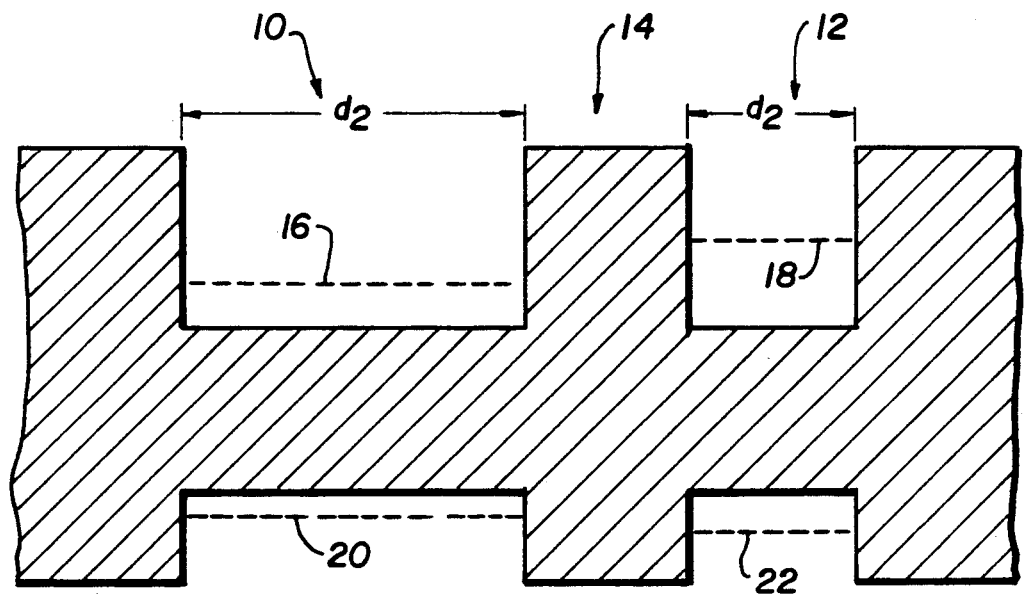
FIGS. 1A and 1B are illustrative of energy band diagrams helpful in understanding the operation of the subject invention.
Figure 1B:
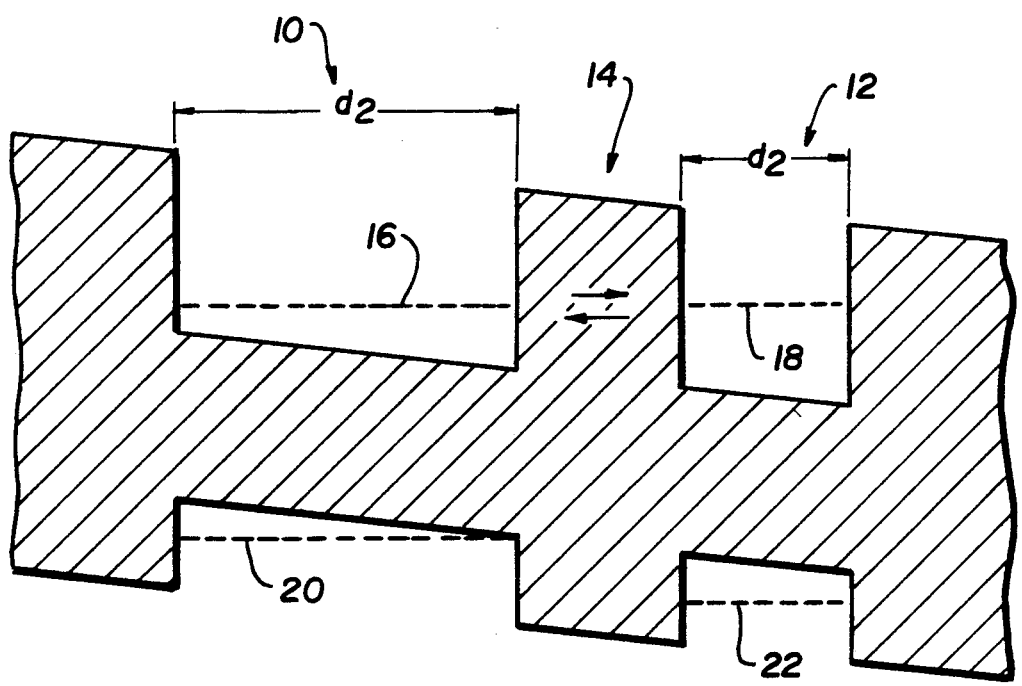

Referring now to the drawings and more particularly to FIGS. 1A and 1B, what is shown thereat are two energy band diagrams for two quantum wells 10 and 12 of different widths $d_1$ and $d_2$ which are located in relative close proximity to each other but separated by a barrier 14. The upper part of the diagrams shown in FIGS. 1A and 1B represent the sub-band energies for electrons in the conduction band whereas the lower part of the diagrams represent sub-band energies for holes in the valence band. As noted, electron-hole pairs in each quantum well form a bound state known as an exciton.

Because of the differing widths of the two quantum wells 10 and 12, they have distinct and unequal minimum energy levels as indicated by reference numerals 16, 18 and 20, 22. In absence of an applied external electric field as shown in FIG. 1A, the respective energy levels of the electron sub-band energies and the hole sub-band energies are unequal, with the quantum well 12 having a minimum energy level for both electrons and holes greater than that of the quantum well 10. However, with the application of an external electric field of a predetermined magnitude, it is possible to bring the electron sub-bands into resonance. This is shown in FIG. 1B. There the electron energy levels 16 and 18 are substantially equal. The same situation, however, does not exist for the hole sub-band energy levels 20 and 22. Under the conditions shown in FIG. 1B, resonant electron tunneling occurs back and forth between the quantum wells 10 and 12 through the barrier 14 and as a consequence, alters the absorption coefficient of light near the excitonic absorption feature.

Figure 6:
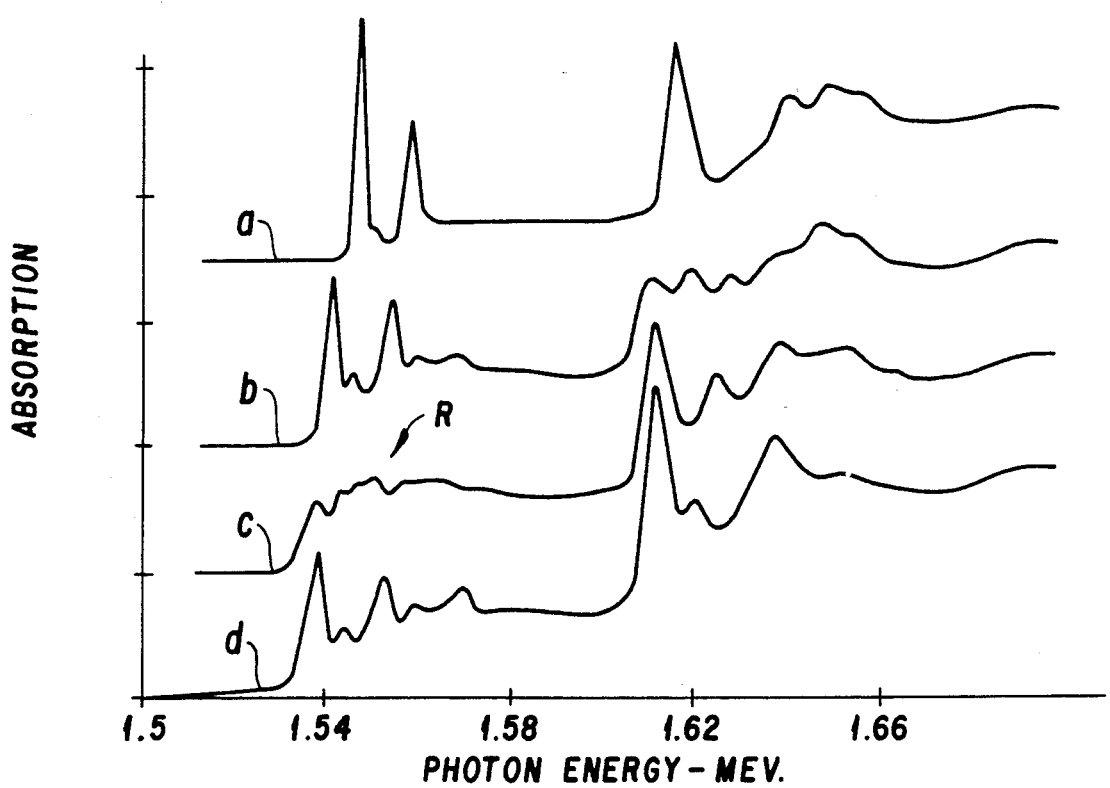
FIGS. 6 and 7 disclose two sets of characteristic curves helpful in understanding the subject invention.

This is further illustrated in FIG. 6 where four curves a, b, c and d represent the absorption characteristic for incident photon energy for values of 0, 2.0, 3.0, and 4.5 volts, respectively, applied across a quantum well device in accordance with the invention. As shown for a bias voltage of substantially 3.0 volts (curve c), a dramatic change in description occurs at the region R and is indicative of a resonance condition.

The electric field required to bring the electron sub-bands into resonance depends upon the details of the two wells 10 and 12, but is generally of the order of 40,000 V/cm as opposed to 100,000 V/cm necessary to implement the quantum-confined Stark effect which has heretofore been utilized to achieve optical modulation of light translating through a quantum well semiconductor device.

Applicants have predicted that the change in absorption coefficient and the corresponding change in the refractive index is considerably larger where quantum wells of different widths are grown in relatively close proximity to one another and their electron sub-bands are brought into resonance as opposed to the results obtained associated with the quantum confined Stark effect. This effect has been termed resonant field ionization of quantum confined excitons.

Applicants have theoretically determined that the change in the absorption coefficient associated with resonant field ionization of quantum confined excitons is of the order of 10,000 cm and the corresponding refractive index change is of the order of 0.001. This now permits one to obtain a reasonable amount of variable attenuation or phase shift in a device according to this invention in which the distance of propagation through the active quantum well region is on the order of micrometers.

Figure 2:
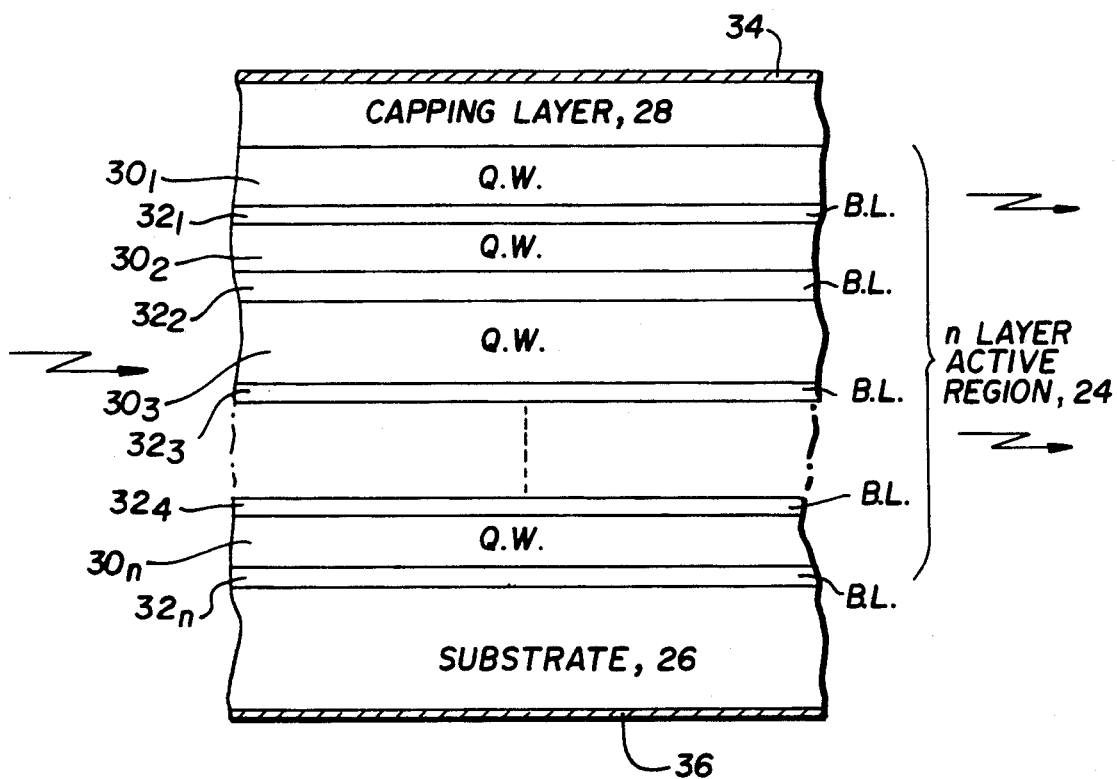
FIG. 2 is a schematic diagram representative of a multilayer structure of a semiconductor device broadly embodying an electro-optic phase shifter.
Figure 3:
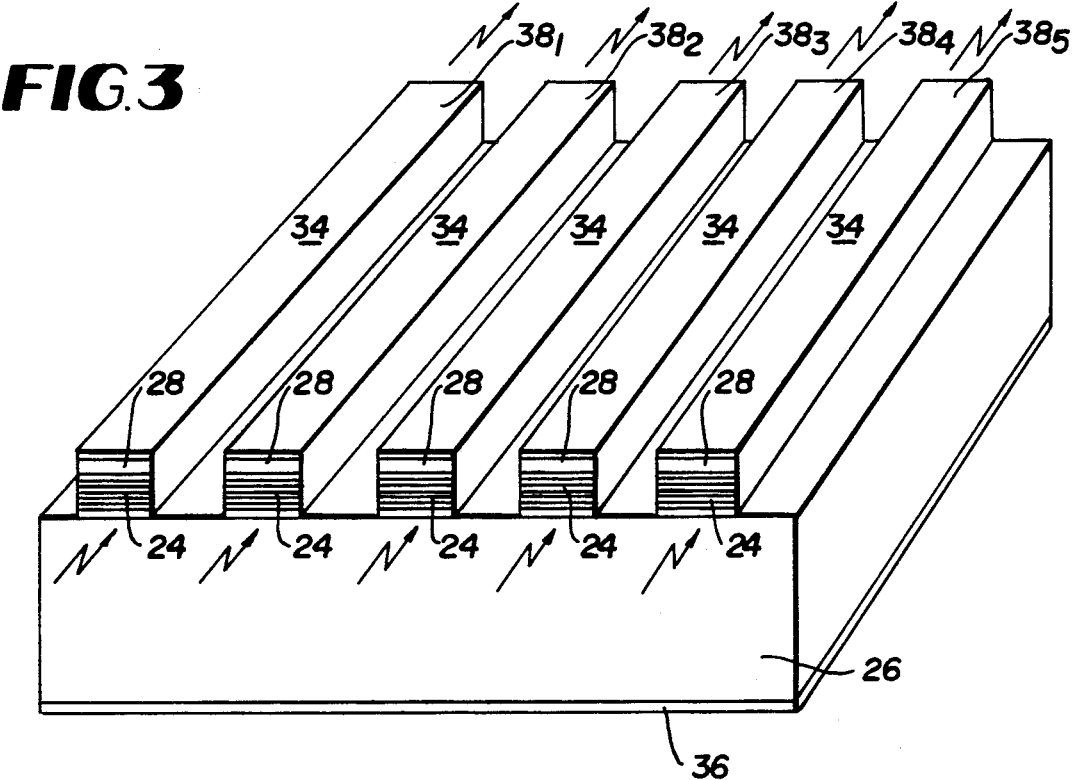
FIG. 3 is a perspective view of an electro-optic phase shifter utilizing the semiconductor structure of FIG. 2.
Figure 4:
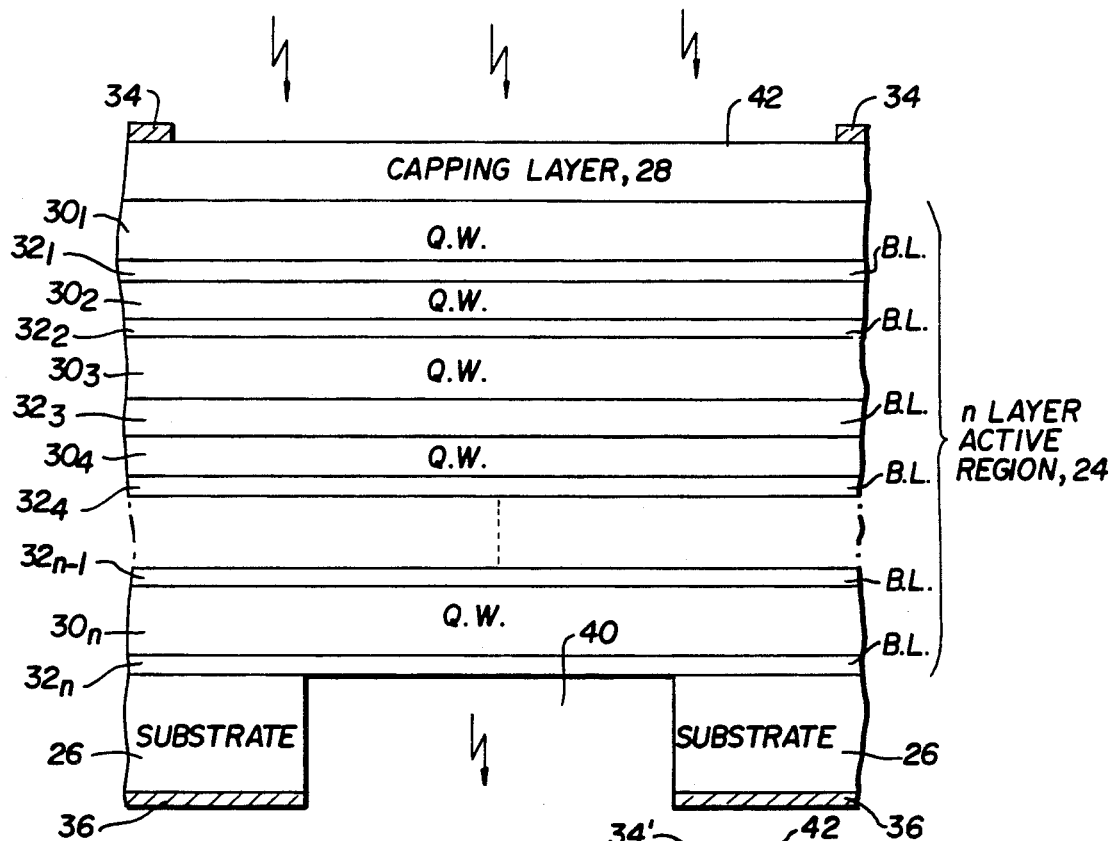
FIG. 4 is a schematic diagram representative of a semiconductor structure embodying an electro-optic modulator in accordance with the subject invention.
Figure 5:
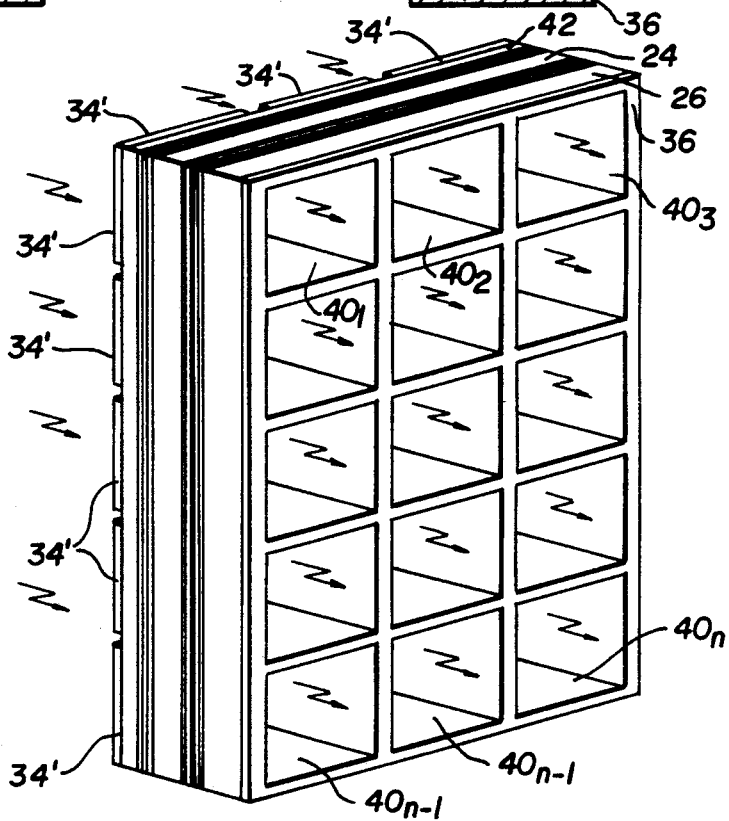
FIG. 5 is a perspective view of an electro-optic modulator device utilizing the structure shown in FIG. 4.

This now leads to a consideration of FIGS. 2 and 3 which are illustrative of an optical phase shifter. FIGS. 4 and 5, on the other hand, are illustrative of an optical modulator. Both embodiments utilize the principle of resonant field ionization of quantum confined excitons.

Referring now to FIG. 2, shown thereat is a fragmentary cross sectional view diagrammatically illustrative of an active quantum well region 24 grown in discrete contiguous layers on a substrate 26 with a capping layer 28 overlaying the active region 24. The active region 24 comprises a plurality (n) of separated quantum well (Q.W.) layers $30_1, 30_2, 30_3 \ldots 30_n$ of selectively different widths and wherein pairs of quantum well layers are separated by relatively thin semiconductor barrier layers (B.L.) $32_1 \ldots 32_2 \ldots 32_n$ of predetermined width. In order to apply an electric field across the active region 24, there is included a pair of ohmic contact layers 34 and 36 respectively applied to the exposed outer surfaces of the capping layer 28 of the substrate 26, respectively. The thickness of the active region 24 is on the order of 1 micrometer or greater and if light is propagated parallel to the interfaces between the quantum well layers, the light leaving the device will experience a phase shift relative to that entering it when the device is biased to the condition of resonant field ionization.

Figure 7:
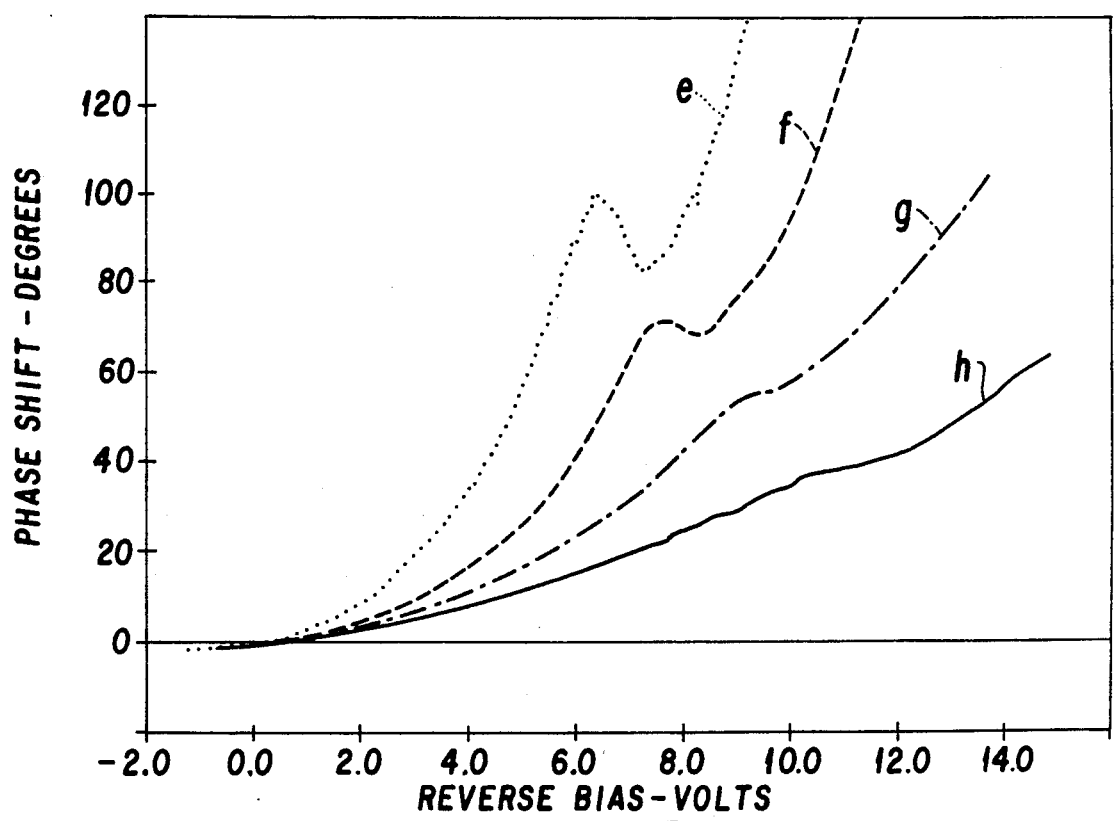

This is indicated by the four curves e, f, g and h of FIG. 7 for light having wavelengths of 860 nm, 870 nm, 885 nm and 900 nm, respectively. It can be seen that the curves, particularly e, f and g exhibit distinctive bumps in the bias region between 6.0 and 10.0 volts which is a direct result of the coupling of the quantum wells at resonance.

Such a quantum well structure can be readily integrated into an optical chip design containing, for example, a light source, not shown, such as a laser. There is an inherent flexibility associated with the device in that the behavior is different for light polarized parallel to the layers than for light polarized perpendicular to the layers.

Referring now to FIG. 3, there is shown a one dimensional phase shifter array fabricated on a common substrate 26 where the array is comprised of a plurality of separate elongated portions $38_1, 38_2, 38_3, 38_4$ and $38_5$ of the quantum well structure 24. Each portion is adapted to act as a separate phase shifter for the light propagating therethrough. Accordingly, the source can be a common optical source or several different sources could impinge on one or more of the phase shifter elements separately and depending upon the characteristics of the light source, the associated phase shift will be determined by the specific design of the active region, i.e. the quantum well structure 24.

Referring now to FIG. 4, there is disclosed an embodiment of the invention which is adapted to modulate light energy. It is similar to the device shown in FIG. 2 in that it also includes an n layer active region 24 comprised of a plurality of quantum well layers $30_1 \ldots 30_n$ of selectively different widths separated by barrier layers $32_1 \ldots 32_n$. The substrate 26, however, now includes one or more openings 40 which operate as exit windows for light energy propagated through the device. The capping layer 28, moreover, comprises a transparent or otherwise light conducting layer. Light energy is now coupled to the device at an angle perpendicular to the quantum well interfaces. Ohmic contact layers 34 and 36 are included but removed from window region 40 of the substrate and an exposed area 42 on the capping layer 28. An incident plane wave from an external source, not shown, is now attenuated as it traverses the device. The attenuation depends upon the external electric field imposed on the device by the potential applied across the ohmic contact layers 34 and 36.

Referring now to FIG. 5, shown thereat is a two dimensional spatial light modulator configured as a rectangular array of windows $40_1$, $40_2$ ... $40_{n-1}$, $40_n$ in the substrate 40. Thus light impinging upon the rear of the structure shown in FIG. 5 is propagated through the active region 24 where it is emitted as modulated light through the respective windows $40_1$ ... $40_n$. The ohmic contact layer 40 now is configured, for example, in discrete sections 40' on the capping layers with the ohmic contact layer 36 on the substrate 26 so that each region can be independently addressed and now the input energy undergoes respective intensity modulation at each location depending on the external electric field imposed on the particular region of the device.

Although the optical modulator configuration shown in FIG. 5 has the incident light applied orthogonal to the inner faces, when desirable, a modulator can be implemented where the light is propagated parallel to the inner faces of the quantum well as shown in FIG. 2.

In each instance, the devices disclosed herein can be integrated into an optical chip design and can be used with light polarizations parallel and perpendicular to the well boundaries. The devices according to the present invention can be manufactured or fabricated from quantum wells of a semiconductor material of any type for which very thin layers on the order of 100 angstroms thickness can be grown between layers on a second semiconductor material with a larger band gap than that of the quantum well material in accordance with known crystal growth techniques, a typical example being molecular beam epitaxy (MBE).

The properties of the quantum well material and the surrounding material that influences the properties of the device are the band gaps and are dependent upon the effective masses of the electrons and holes, the band offsets, i.e. differences between the absolute values of band origins in the well and cladding materials, the optical properties of the semiconductors in the vicinity of the band gaps, and the exciton recombination time at room temperature or at the operating temperature of the device. With specified semiconductors for the well and cladding materials, additional control over the properties of the device can be exercised by the choice of the widths of the two quantum wells of the device and of the barrier that separates the wells. These device parameters can be chosen to optimize device performance at a designated wavelength and with a given polarization. The choice of the configuration, whether it be a single element or a phased array design will depend upon the desired application.

Since electro-optical devices of the present invention require less external electric fields and thus less power, the possibility of electric field inducted breakdown and subsequent damage to the device is much less. Also since the variation in optical phase shift or attenuation which is obtained with devices fabricated in accordance with the subject invention is much larger than that obtained in quantum confined Stark effect devices, the optical pathlength through the active region of the device can be made smaller and the densities of active quantum well material can be made correspondingly less.

Having thus shown and described what is at present considered to be the preferred embodiments of the invention, it should be noted that the same has been made by way of illustration and not limitation. Accordingly, all modifications, alterations and changes coming within the spirit and scope of the invention are herein meant to be included.

We claim:

1. A semiconductor device for modifying optical transmission comprising:

a substrate;

a multilayered semiconductor quantum well structure located on said substrate and including a plurality of pairs of quantum well layers of mutually difference widths separated from each other by a respective semiconductor barrier layer;

an outer capping layer on said semiconductor structure, said quantum well structure being located intermediate said substrate and capping layer thereby;

means for applying an electric potential across said electric field across said quantum well structure which when applied generates an electric field across said quantum well layers and operates to bring the electron sub-band energies of said quantum well layers of different widths into and out of resonance, thereby allowing excitons in the wells to undergo resonant field ionization, wherein electrons tunnel back and forth between said wells causing an alteration of the coefficient of light absorption of wavelengths in the region of the excitonic absorption feature; and means for directing optical energy from and external source to said plurality of pairs of quantum layers substantially parallel to the interfaces between contiguous layers of said semiconductor structure whereby light transmitted through said structure will undergo a phase shift due to resonant field ionization of quantum confined excitons.

2. The device as defined by claim 1 wherein said means for applying said electric potential includes means for applying a phase shifting control signal across said semiconductor structure.

3. The device as defined by claim 1 wherein said semiconductor structure comprises an array of discrete portions of said structure.

4. The device as defined by claim 3 wherein said array comprises a one dimensional array including a plurality of like elongated portions of said semiconductor structure arranged in substantially parallel relationship on said substrate.

5. A semiconductor device for modifying optical transmission comprising:

a substrate, including at least one opening therein for providing an exit window for the passage of light energy out of said device;

a multilayered semiconductor quantum well structure located on said substrate and including a plurality of pairs of quantum well layers of mutually different widths separated from each other by a respective semiconductor barrier layer;

a light transmissive outer capping layer on said semiconductor structure, said quantum well structure being located intermediate said substrate and capping layer thereby;

means for directing light perpendicular to the interfaces of contiguous layers of said semiconductor structure; and means for applying an electric potential across said quantum well structure which when applied generates an electric field across said quantum well layers and operates to bring the electron sub-band energies of said quantum well layers of different widths into and out of resonance, thereby allowing excitons in the wells to undergo resonant field ionization, wherein electrons tunnel back and forth between said wells causing an alteration of the coefficient of light absorption for wavelengths in the region of the excitonic absorption feature.

6. The device as defined by claim 5 wherein said means for applying electric potential include means for applying a modulating signal whereby the light leaving said device is intensity modulated.

7. The device as defined by claim 5 wherein said substrate includes a plurality of openings therein and providing thereby a plurality of exit windows for light leaving said device.

8. The device as defined by claim 7 wherein said plurality of exit windows are arranged in a two dimensional array.

9. The device as defined by claim 8 and wherein said means for applying electric potential includes means for applying a separate modulating potential across regions of said quantum well structure adjacent each exit window of said two dimensional array, providing thereby independently addressable elements whereby an incident plane wave impinging on said device experiences a modulation at a given location of said array depending on the external electric field applied at a particular region.

* * * * *

UNITED STATES PATENT AND TRADEMARK OFFICE
CERTIFICATE OF CORRECTION

PATENT NO. : 5,047,822
DATED : September 10, 1991
INVENTOR(S) : John W. Little, Jr. et al It is certified that error appears in the above-identified patent and that said Letters Patent is hereby corrected as shown below:

On the title page,

Under "References Cited" [56], add

--FOREIGN PATENT DOCUMENTS

| | | | |
|---|---|---|---|
| 2589630 | 5/1987 | French Application | H01L-33/00 |
| 0155802 | 9/1985 | European Application | G02F-3/00 |
| 0253174 | 1/1988 | European Application | H01L-29/205--. |

Under "Other Publications" [56], line 8, "REsistance" should read --Resistance--; line 23, "American" should read --America--.

Signed and Sealed this

Third Day of May, 1994

Attest:

BRUCE LEHMAN

Attesting Officer

Commissioner of Patents and Trademarks